United States Patent
El Moumouhi et al.

(10) Patent No.: US 9,763,175 B2
(45) Date of Patent: Sep. 12, 2017

(54) MANAGEMENT OF MOBILITY IN A COMMUNICATION NETWORK AS A FUNCTION OF THE QUALITY OF SERVICE OF AN ACCESSED SERVICE

(71) Applicant: Orange, Paris (FR)

(72) Inventors: Sanaa El Moumouhi, Montrouge (FR); Benoît Radier, Perros Guirec (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/415,716

(22) PCT Filed: Jul. 17, 2013

(86) PCT No.: PCT/FR2013/051719
§ 371 (c)(1),
(2) Date: Jan. 19, 2015

(87) PCT Pub. No.: WO2014/013196
PCT Pub. Date: Jan. 23, 2014

(65) Prior Publication Data
US 2015/0215850 A1      Jul. 30, 2015

(30) Foreign Application Priority Data

Jul. 20, 2012   (FR) ..................... 12 57050

(51) Int. Cl.
*H04W 4/00* (2009.01)
*H04W 48/16* (2009.01)
(Continued)

(52) U.S. Cl.
CPC ............. *H04W 48/16* (2013.01); *H04W 8/02* (2013.01); *H04W 36/14* (2013.01); *H04W 48/20* (2013.01); *H04W 36/0061* (2013.01)

(58) Field of Classification Search
CPC ....... H04W 48/16; H04W 8/02; H04W 24/02; H04W 48/20
(Continued)

(56) References Cited

U.S. PATENT DOCUMENTS 7,043,277 B1  5/2006 Pfister
7,263,076 B1  8/2007 Leibovitz et al.
(Continued)

FOREIGN PATENT DOCUMENTS

EP    2 571 311 A1    3/2013
WO   WO 2011/050835 A1   5/2011
(Continued)

OTHER PUBLICATIONS

3GPP TS 33.228 v9.1.0 (Jun. 2010) 3rd Generation Partnership Project; Technical Specification Group Services and System Aspects; Generic Authentication Architecture (GAA); Access to network application functions using Hypertext Transfer Protocol over Transport Layer Security (HTTPS) (Release 9), 22 pp., Jun. 2010.
(Continued)

*Primary Examiner* — Thomas Lett
(74) *Attorney, Agent, or Firm* — Knobbe Martens Olson & Bear LLP

(57) ABSTRACT

A method of managing mobility of a mobile terminal in a communication network comprising a plurality of access points and an access points discovery server adapted for providing the mobile terminal with a list of access points selected from among the network access points is disclosed. In some embodiments, the method comprises the following processes, implemented by the access points discovery server: reception of a quality of service class determined by an item of equipment for application of quality of service as a function of a service accessed by the mobile terminal and
(Continued)

Figure 1:
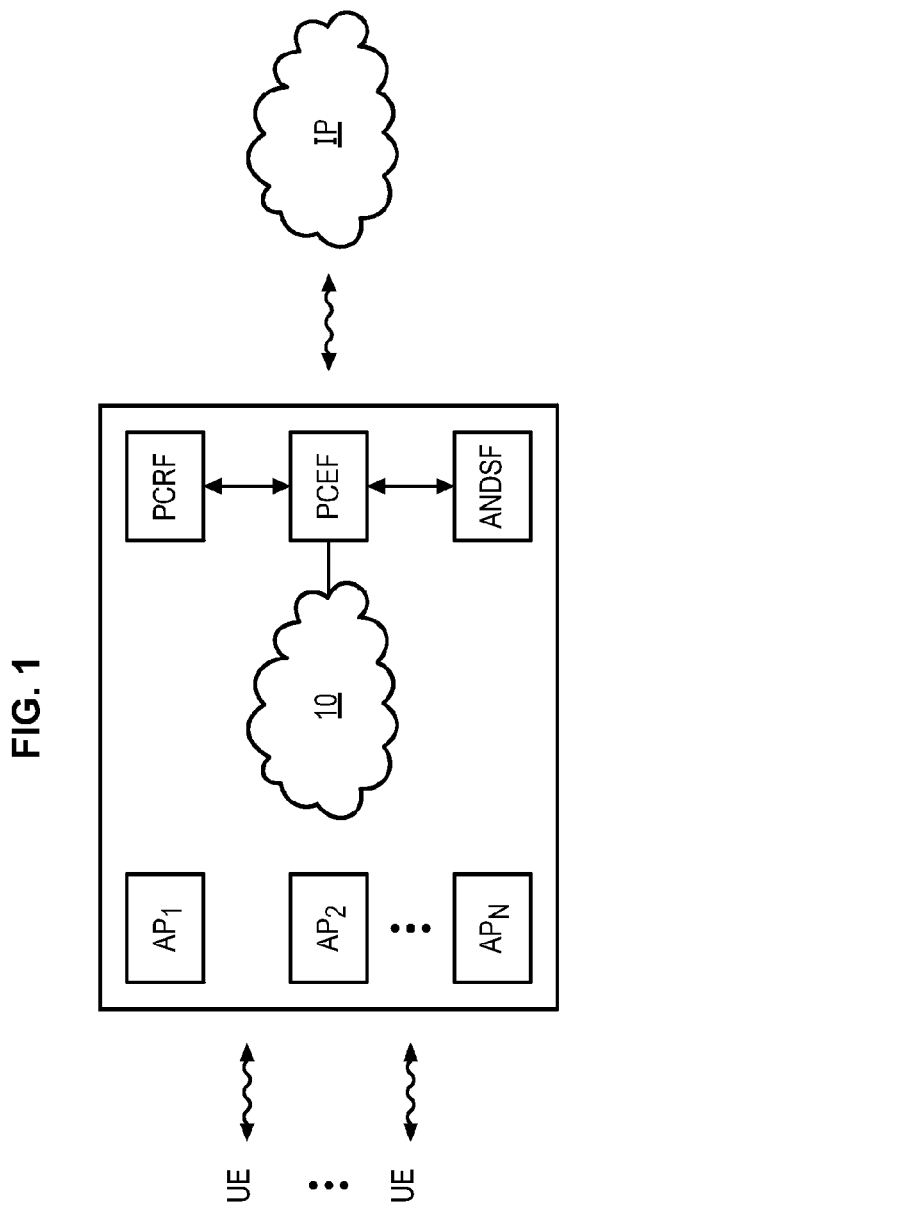

generation of the list of access points by selecting at least one access point compatible with the quality of service class determined by the item of equipment for application of quality of service.

20 Claims, 2 Drawing Sheets

(51) Int. Cl.
| | |
|---|---|
| H04W 36/14 | (2009.01) |
| H04W 8/02 | (2009.01) |
| H04W 48/20 | (2009.01) |
| H04W 36/00 | (2009.01) |

(58) Field of Classification Search
USPC .................................................. 455/432.1
See application file for complete search history.

(56) References Cited

U.S. PATENT DOCUMENTS

| | | | | |
|---|---|---|---|---|
| 7,483,995 | B2 | 1/2009 | Abhishek et al. | |
| 8,160,611 | B1* | 4/2012 | Oroskar | H04W 48/04 455/403 |
| 9,215,335 | B1 | 12/2015 | Nas et al. | |
| 2002/0075844 | A1 | 6/2002 | Hagen | |
| 2002/0183038 | A1 | 12/2002 | Comstock et al. | |
| 2003/0134615 | A1 | 7/2003 | Takeuchi | |
| 2003/0140256 | A1 | 7/2003 | Hauenstein et al. | |
| 2004/0156372 | A1* | 8/2004 | Hussa | H04W 48/20 370/401 |
| 2005/0003827 | A1* | 1/2005 | Whelan | H04W 16/10 455/454 |
| 2005/0003829 | A1 | 1/2005 | Lala et al. | |
| 2005/0270998 | A1 | 12/2005 | Rambo et al. | |
| 2007/0033139 | A1 | 2/2007 | Handler | |
| 2007/0072584 | A1 | 3/2007 | Jain et al. | |
| 2008/0032738 | A1 | 2/2008 | Boyer et al. | |
| 2009/0047948 | A1 | 2/2009 | Turetsky et al. | |
| 2009/0048915 | A1 | 2/2009 | Chan | |
| 2009/0221287 | A1 | 9/2009 | Balasubramanian et al. | |
| 2009/0239576 | A1 | 9/2009 | Liao et al. | |
| 2009/0245176 | A1* | 10/2009 | Balasubramanian | H04W 48/20 370/328 |
| 2012/0064856 | A1 | 3/2012 | Nandal | |
| 2012/0122515 | A1 | 5/2012 | Han et al. | |
| 2013/0143542 | A1* | 6/2013 | Kovvali | H04W 48/18 455/418 |
| 2013/0155849 | A1* | 6/2013 | Koodli | H04L 45/308 370/230 |
| 2013/0208696 | A1 | 8/2013 | Garcia Martin et al. | |
| 2013/0272285 | A1* | 10/2013 | Goldsmith | H04W 24/02 370/338 |
| 2014/0080539 | A1* | 3/2014 | Scherzer | H04W 72/02 455/525 |
| 2014/0204903 | A1* | 7/2014 | Kim | H04W 48/18 370/331 |
| 2014/0206349 | A1* | 7/2014 | Bertrand | H04W 48/18 455/434 |
| 2014/0315536 | A1* | 10/2014 | Chow | H04W 8/18 455/419 |
| 2015/0181407 | A1 | 6/2015 | El Moumouhi et al. | |
| 2015/0208227 | A1 | 7/2015 | El Moumouhi et al. | |

FOREIGN PATENT DOCUMENTS

| | | |
|---|---|---|
| WO | WO 2011/147465 A1 | 12/2011 |
| WO | WO 2012/149954 A1 | 11/2012 |
| WO | WO 2014/013155 A1 | 1/2014 |
| WO | WO 2014/013156 A1 | 1/2014 |

OTHER PUBLICATIONS

3GPP TS 23.402 v11.3.0 (Jun. 2012), 3rd Generation Partnership Project; Technical Specification Group Services and Systems Aspects; Architecture enhancements for non-3GPP accesses (Release 11), Jun. 2012, 252 pp.

3GPP TS 32.299 v11.4.0 (Jun. 2012) 3rd Generation Partnership Project; Technical Specification Group Services and System Aspects; Telecommunication management; Charging management; Diameter charging applications (Release 11), 151 pp. Jun. 2012.

3GPP TS 23.060 v11.2.0 (Jun. 2012), 3rd Generation Partnership Project; Technical Specification Group Services and System Aspects; General Packet Radio Service (GPRS); Services description; Stage 2 (Release 11), 335 pp. Jun. 2012.

3GPP TS 24.302 V11.3.0 (Jun. 2012) 3rd Generation Partnership Project; Technical Specification Group Core Network and Terminals; Access to the 3GPP Evolved Packet Core (EPC) via non-3GPP access networks: Stage 3 (Release 11), 60 pp. Jun. 2012.

3GPP TS 24.312 V11.3.0 (Jun. 2012) 3rd Generation Partnership Project; Technical Specification Group Core Network and Terminals; Access Network Discovery and Selection Function (ANDSF) Management Object (MO) (Release 11), 162 pp. Jun. 2012.

Corici, et al. Enhanced access network discovery and selection in 3GPP evolved packet core. *3rd IEEE LCN Workshop on User Mobility and Vehicular Networks (ON-MOVE 2009)*, Zurich, Switzerland, Oct. 20-23, 2009, pp. 677-682.

Ericsson, et al. Aug. 24, 2010. QoS for a 3GPP UE in BBF. 3GPP Draft; S2-103647_QOS_3GPP_UE_BBF, 3rd Generation Partnership Project (3GPP), Mobile Competence Centre; 650, Route des Lucioles, F-06921 Sophia-Antipolis Cedex, France, vol. SA WG2, no. Brunstad; 20100903, 19 pp.

Tervonen, J. Dec. 22, 2010. Deliverable DA2.2.23 Policy and Charging Control Functionality with WLAN and PBRM. Retrieved from the Internet on May 2, 2013: URL:http://www.futureinternet.fi/publications/ICT_SHOK_FI_Phase2_DA2.2.23_10.pdf. 25 pages.

Tervonen, J. Jun. 30, 2010. Deliverable DA2.2.22 Offloading Traffic from Cellular Networks with PBRM. Retrieved from the Internet on Oct. 19, 2011: URL:http://www.futureinternet.fi/publications/ICT_SHOK_FI Phase2_DA2.2.22_10-1.pdf. 39 pages.

Preliminary Search Report dated Apr. 12, 2013 in French patent application No. 1257065, 2 pp.

International Search Report mailed Sep. 24, 2013 for International Application No. PCT/FR2013/051460 filed Jun. 21, 2013, 7 pp.

Preliminary Search Report dated Apr. 12, 2013 in French patent application No. 1257055, 2 pp.

International Search Report mailed Sep. 24, 2013 for International Application No. PCT/FR2013/051461 filed Jun. 21, 2013, 7 pp.

Preliminary Search Report dated May 15, 2013 in French patent application No. 1257050, 4 pp.

International Search Report mailed Sep. 24, 2013 for International Application No. PCT/FR2013/051719 filed Jul. 17, 2013, 7 pp.

U.S. Appl. No. 14/415,718, filed Jan. 19, 2015, 27 pp.

Preliminary Amendment dated Jan. 19, 2015 in U.S. Appl. No. 14/415,718, 9 pp.

U.S. Appl. No. 14/415,720, filed Jan. 19, 2015, 18 pp.

Preliminary Amendment dated Jan. 19, 2015 in U.S. Appl. No. 14/415,720, 8 pp.

Office Action mailed Aug. 27, 2015 for U.S. Appl. No. 14/415,720, filed Jan. 19, 2015.

Amendment and Response filed Nov. 12, 2015 in U.S. Appl. No. 14/415,720, filed Jan. 19, 2015.

Office Action mailed Feb. 18, 2016 for U.S. Appl. No. 14/415,720, filed Jan. 19, 2015.

Office Action mailed Jul. 15, 2016 for U.S. Appl. No. 14/415,718, filed Jan. 19, 2015.

Applicant Response after Final dated May 17, 2016 for U.S. Appl. No. 14/415,720, filed Jan. 19, 2015.

U.S. Office Action dated Jun. 7, 2016 for U.S. Appl. No. 14/415,720, filed Jan. 19, 2015.

Amendment and Response filed Sep. 7, 2016 in U.S. Appl. No. 14/415,720, filed Jan. 19, 2015.

U.S. Office Action dated Dec. 7, 2016 in co-pending U.S. Appl. No. 14/415,720.

(56) References Cited

OTHER PUBLICATIONS

Klimasauskas, Juras; Designing the algorithm for network discovery and selection in heterogeneous radio network environment, Student Master Thesis; Project Library in Aalborg University; Dec. 1, 2011; 78 pages.
Amendment and Response dated Nov. 9, 2016 for U.S. Appl. No. 14/415,718, dated Jan. 19, 2015.
Office Action mailed Jan. 6, 2017 for U.S. Appl. No. 14/415,718, dated Jan. 19, 2015.

* cited by examiner

MANAGEMENT OF MOBILITY IN A COMMUNICATION NETWORK AS A FUNCTION OF THE QUALITY OF SERVICE OF AN ACCESSED SERVICE

RELATED APPLICATIONS

This application is the U.S. National Phase of Application No. PCT/FR2013/051461 entitled "MANAGEMENT OF MOBILITY IN A COMMUNICATION NETWORK AS A FUNCTION OF THE QUALITY OF SERVICE OF AN ACCESSED SERVICE" filed Jul. 17, 2013, which designated the United States, and which claims the benefit of French Application No. 1257050 filed Jul. 20, 2012.

GENERAL TECHNICAL FIELD

The invention relates to the field of cellular communications and more particularly to the management of mobility or movement between 3GPP and non-3GPP access networks, as specified by the 3GPP standard in the technical specifications TS 24.302 and TS 24.312.

STATE OF THE ART

When a user of a mobile communication terminal has subscribed to a telecommunications operator, this telecommunications operator allows the user to connect to a communications network via his/her mobile terminal, in return for taking a subscription in order to access several types of services from an IP (Internet Protocol) network, such as the Internet network.

When this network is a 3GPP (for example, Edge, 3G, 3G+, 4G, LTE) cellular network, it includes a network core, as well as a 3GPP access network including a set of 3GPP access points (NodeB for 3G) at which the terminal connects.

In addition to the 3GPP access network, the operator may make available to its subscribers non-3GPP access points (designated by the term of <<hot spots>>) for increasing the coverage and the capacity of the 3GPP access network.

The communications terminal may thus move from a 3GPP access network to a non-3GPP network, and vice versa.

In the 3GPP standard, notably in the specifications TS 24.302 and TS 24.312, a server is provided for discovering access points (Access Network Discovery and Selection Function (ANDSF)). In particular, this ANDSF server, on request from a moving mobile terminal, provides a list of access points in proximity to the position of the mobile terminal. The access points are relative to non-3GPP (for example Wi-Fi, Wimax) and/or 3GPP access networks (for example, Edge, 3G, 3G+, 4G, LTE).

Additionally, this ANDSF server includes a database comprising information on the topology of the access networks and information on the rules for selecting an access network, notably the rules of a telecommunications operator, which allows ordering of the list of the types of access and of the access points which the terminal may preferably use.

In order to receive the list, the terminal transmits a request to the ANDSF server so that, in the event of a change in the position of the mobile terminal or in the event of degradation of the quality of the radio link, the terminal may recover the list of available access points in proximity to the mobile terminal.

Thus the mobile terminal stores in a memory a list of access points to which it may connect, prepared by the ANDSF server, and then moves towards an access network of the list, if necessary, by using this list of access points.

This list of access points appears as an ordered list of access points in proximity to the mobile terminal, optionally classified by access network types (3G, 4G, WiFi, Wimax).

The management of mobility presently deployed by the ANDSF server is however not based on the characteristics of the future access point to which the terminal during movement will be attached. Now, if the terminal during movement is accessing a service, the access points of the list may not be capable of supporting the service in terms of service quality, which may cause degradation of the service quality when the mobile terminal is attached to another access point of this list.

In document <<Deliverable DA2.2.23 Policy and Charging Control Functionality with WLAN and PBRM>> of Janne Tervonen, published in 2010, the possibility was mentioned of interfacing the PCRF function with the ANDSF function, in order to modify the policies of the latter entity in order to <<off-load>> certain resource-consuming flows from an LTE access point to a WLAN access point. However, in order to modify the ANDSF policies, this solution only takes into account information collected by the PCEF entity, concerning traffic in the network, and absolutely does not take into account the service quality of the services accessed by the terminal. Thus, with such a solution, a WLAN access point may be selected for switching over a resource-consuming flow while it is not capable of providing sufficient quality of service for this type of flow.

PRESENTATION OF THE INVENTION

The invention gives the possibility of taking into account the service quality provided by the access points of a communications network within the scope of managing movement of a terminal and for this purpose, according to a first aspect, proposes a method for managing movement of a mobile terminal in a communications network comprising a plurality of access points and a server for discovering access points suitable for providing the mobile terminal with a list of access points selected from the access points of the network, the method comprising the following steps, applied by the server for discovering access points:

receiving a service quality class determined by an item of equipment for applying service quality depending on a service accessed by the mobile terminal; and generating the list of access points by selecting at least one access point compatible with the service quality class determined by the item of equipment for applying service quality.

The method of the invention is advantageously completed by the following features, taken alone or in any of their technically possible combination:

the item of equipment for applying service quality transmits to a server of service quality rules, a request for determining the service quality to be applied to the service accessed by the mobile terminal and receives from said server of rules for applying service quality, the service quality class associated with said service.

the generation of the list of access points is subsequent to receiving by the server for discovering access points, a request for recovering said list of access points transmitted by the mobile terminal, the method further comprising transmission of the list of access points, generated at the mobile terminal, and updating of the list of access points stored in the mobile terminal, by means of the generated list of access points.

the access point compatible with the service quality class is an access point capable of providing the service according to a service quality class providing a service quality level greater than or equal to the service quality class determined by the item of equipment for applying service quality.

the server for discovering access points is an ANDSF server according to the 3GPP standard and the item of equipment for applying service quality is an item of equipment configured for applying a PCEF function as defined by the 3GPP standard.

According to a second aspect, the invention also relates to a server for discovering access points capable of transmitting to a mobile terminal a list of access points selected from access points of a communications network, the server for discovering access points being further configured for:

receiving a service quality class of an item of equipment for applying service quality of the communications network, said service quality class depending on a service accessed by the mobile terminal; and generating the list of access points by selecting at least one access point compatible with the service quality class received from the item of equipment for applying service quality.

According to a third aspect, the invention relates to an item of equipment for applying service quality capable of receiving from a mobile terminal a type of service associated with the service accessed by the mobile terminal, of determining a service quality class depending on said service type and of transmitting said service quality class to a server for discovering access points.

According to a fourth aspect, the invention relates to a communications network comprising a plurality of access points capable of delivering a service to a mobile terminal, an item of equipment for applying quality of services and a server for discovering access points, the item of equipment for applying quality of services being configured for determining a service class according to a service accessed by the mobile terminal and for transmitting said service quality class to the server for discovering access points; and the server for discovering access points being configured in order to generate a list of access points by selecting at least one access point compatible with the service quality class received from the item of equipment for applying service quality and to transmit to the mobile terminal said list of access points.

According to a fifth aspect, the invention relates to a mobile terminal comprising a module for selecting an access point of a communications network, this selection module being configured for selecting the access point from a list of access points received from a server for discovering access points of the communications network, this list of access points being generated by selecting at least one access point compatible with a service quality class determined by an item of equipment for applying service quality depending on a service accessed by the mobile terminal.

According to a sixth aspect, the invention relates to a computer program product comprising code instructions for executing a method according to the first aspect of the invention, when the latter is executed by a processor.

By being based on the service quality provided by the access points of the communications network, the management of mobility of a mobile terminal from an access network to another is optimized.

PRESENTATION OF THE FIGURES

Figure 2:
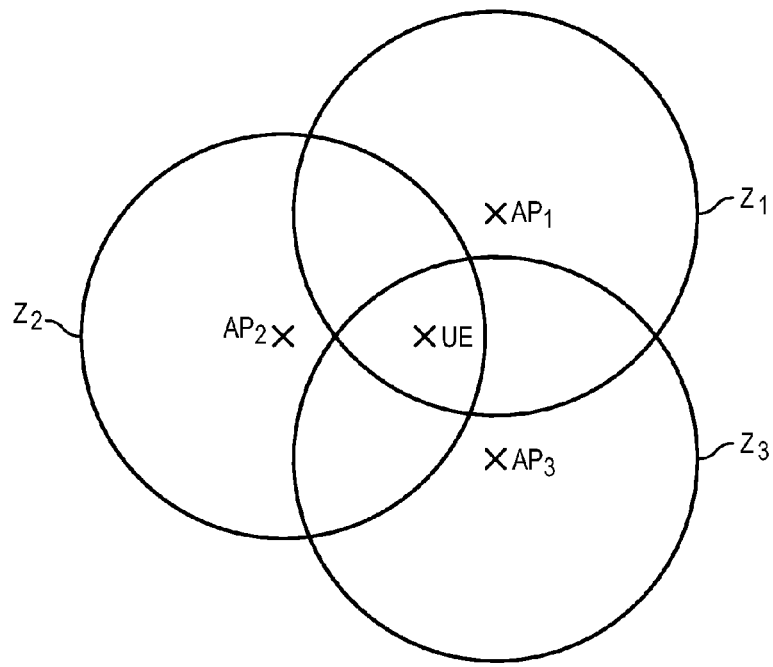
Figure 3:
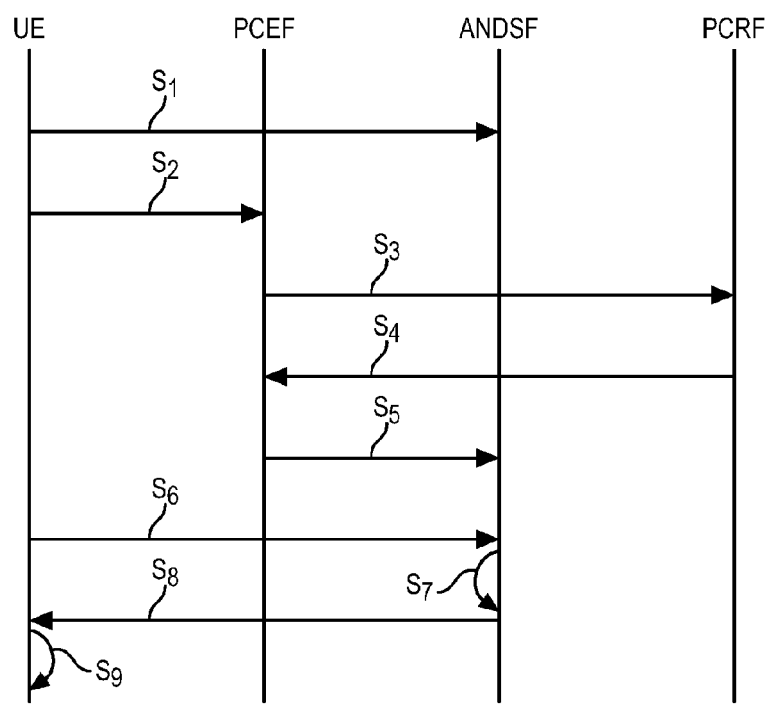

Other features, objects and advantages of the invention will emerge from the description which follows, which is purely illustrative and non-limiting and which should be read with reference to the appended drawings wherein:

FIG. 1 schematically illustrates a communications network of an operator;

FIG. 2 schematically illustrates the deployment of access points of a communications network of an operator; and FIG. 3 illustrates a method for managing mobility of a mobile terminal in a communications network according to the first embodiment of the invention.

DETAILED DESCRIPTION OF THE INVENTION

In connection with FIG. 1, a communications network according to the invention is illustrated.

The network comprises several access points APi allowing access to access networks 10 and at least one mobile terminal UE. An access network allows the mobile terminal UE to connect to an IP (Internet protocol) network of the Internet type for accessing services.

An access point Api (i=1, 2, 3) defines a coverage area Zi (i=1, 2, 3) in which the mobile terminal UE is localized relatively to an access point. These access points are either 3GPP access points or non-3GPP access points. In the case of a 4G access network, the access points are items of equipment called <<eNodeBs>>. In the case of a 3G access network, the access points are <<NodeBs>>. In the case of a 2G or GPRS access network, the access points are BTSes (Base Transceiver Stations). In the case of a WiFi access network, the access points are <<hot spots>>. Finally in the case of a Wimax access network, the access points are base stations.

The network comprises a server for discovering access points, designated by ANDSF, which allows management of a list of access points, an item of equipment for applying surface quality, designated by PCES (Policy & Charging Enforcement Function), connected to a service quality rule server designated by PCRF (Policy & Charging and Rules Function) comprising a database containing all the rules of QoS service classes set by an operator depending on various parameters (type of service, type of user, etc.).

The terminologies ANDSF, PCEF and PCRF are repeated from 3GPP standards and are subsequently used, without the invention being limited to the sole entities thereby designated in the standards, the invention may be applied to any network having physical entities having the same functionalities as these entities. The item of PCEF equipment and the PCRF server are in particular specified in the 3GPP standard, in technical specification TS 23.060.

The item of PCEF equipment, in connection with the PCRF server, notably allows management of the service quality class of a user session as far as an access point APi of the network, by setting a QoS quality class associated with each session and applied for sessions as far as the access point APi. In particular, a mobile terminal UE wishing to access a service via an access point APi to which it is connected, first transmits a request to the item of PCEF equipment, which then recovers at the database of the PCRF server the rules of service quality classes (typically defined by the operator of the network) and applies this rule on the session as far as the access point in order to deliver the service to the relevant mobile terminal UE.

Now, reference is made to FIG. 2 which illustrates a mobile terminal UE localized in the coverage area Z1, Z2, Z3 of three access points AP1, AP2, AP3 of a communications network.

It is considered that the mobile terminal UE is connected to the access point AP1 and that it is accessing a certain type of service.

It is specified here that by <<connected to an access point>> is meant the fact that the mobile terminal UE has an open session with the access point for receiving a service.

It is also specified that by <<covered by an access point>> is meant the fact that the mobile terminal UE is localized in a coverage area of an access point APi.

If the mobile terminal UE is mobile in the network, the terminal may intend to decide to move from the access point AP1 towards another access point AP2 and/or AP3, which may be selected by means of the mobility management method described hereafter.

In connection with FIG. 3, a method for managing the mobility of a mobile terminal UE according to an embodiment of the present invention is described.

Before moving between access points, the mobile terminal UE detects (a non-detailed step) the requirements of initiating the movement procedure on the basis of a triggering event, for example an event such as degradation of the transmission channel of the service.

Before initiating movement, the terminal may, first of all, be authenticated (step S1) at the ANDSF server before establishing a communication session with the latter.

The mobile terminal UE then transmits (step S2) to the item of PCEF equipment, the type of service which it is accessing (for example VoIP or Streaming), for the current session, by means of a message containing an identifier of this type of service.

Subsequently to receiving this message, the item of PCEF equipment determines a service quality QoS class corresponding to the type of relevant service, to be applied on the service session as far as the access point.

According to a first embodiment illustrated in this FIG. 3, this determination is achieved by the item of PCEF equipment by transmitting (step S3) to the PCRF server a request for determining the service quality QoS class associated with the type of relevant service, optionally containing a service class proposed by the item of PCEF equipment.

As a reply to this request, the PCRF server determines the service quality QoS class assigned to this type of service, by means of service quality rules stored in the database of this PCRF server, and transmits (step S4) to the item of PCEF equipment this service quality QoS class.

As an example, the PCRF server may determine that, for the requested service, the service quality QoS class may be of a level equal to 4. The item of PCEF equipment then recovers the service quality QoS class at the PCRF server, which may be inferior according to the rules defined by the operator of the network (for example a service quality QoS class equal to 3). This first embodiment is particularly suitable in the case of a 4G network where the determination of the service quality class to be set up per session is provided at the PCRF server.

Alternatively, according to another embodiment, the item of PCEF equipment itself determines the service quality QoS class corresponding to the service which the mobile terminal UE accesses and transmits this class to the PCRF server, which contents itself with validating or not this class depending on the service quality rules in its database and returns a validation or validation refusal message to the item of PCEF equipment. This other embodiment is more particularly suitable in the case of a 3G network where the determination of the service quality class is instead provided at the item of PCEF equipment. The service request transmitted by the terminal UE is thus analyzed by the item of PCEF equipment which then determines the service quality QoS class to be set up for this service.

Next, the item of PCEF equipment transmits (step S5) to the ANDSF server the service quality QoS class, used by the current session, as recovered at the PCRF server and as applied in the network.

In this way, the ANDSF server is informed on the service quality QoS class associated with the service accessed by the mobile terminal UE.

Subsequently, the mobile terminal UE sends (step S6) a request for recovering a list of access points to the ANDSF server, for example when this mobile terminal UE determines that it is in a mobility situation.

Subsequently to receiving this request, the ANDSF server then generates (step S7) the list of access points to be returned to the mobile terminal UE, by giving priority to the access points compatible with the service quality QoS class of the service accessed by the mobile terminal UE.

This list is advantageously an ordered list established from a set of possible access points of the communications network, by arranging these access points (optionally grouped per type of access point) according to their compatibility with the service quality QoS class of the service accessed by the mobile terminal UE, for example in an order of increasing service quality QoS class which these access points may provide. In this case, the access points appearing the first in this ordered list, providing the best service quality relatively to the service used, have priority relatively to the following ones, the mobile terminal first trying to be attached to the first access point of the list and then to the second access point upon failing to attach to the first access point, and so forth.

As an example, with a service of the voice-on-IP (VoIP) type associated with a priority service quality QoS class equal to 1, the access points of the 3G type may be indicated first in this ordered list (for example by giving priority to the access points of the 3G type relatively to the access points of the 2G type) relatively to the access points of the WiFi type.

Alternatively, this list may be limited to the access points compatible with the service quality QoS class of the service accessed by the mobile terminal UE, i.e. the access points associated with a service quality class providing a service quality level greater than or equal to the service quality QoS class of the accessed service, excluding the access points which cannot provide such service quality.

Thus, by taking up again the example of a service of the voice-on-IP (VoIP) type associated with a priority service quality QoS class equal to 1, the access points of the 2G or 3G type may be added in this list while the access points of the WiFi type are not added. With a service of the <<streaming>> type, associated with an inferior service quality QoS class equal to 9, all the access points may be added to this list. Finally, in the case of a service of the television type associated with a service quality QoS class equal to 4, the access points of the 4G or WiFi type may be added to the list, the 3G access points may be added depending on the saturation of the network, while the 2G access points are not added.

Once the list is generated, the ANDSF server sends (step S8) this list to the mobile terminal UE so that the latter updates (step S9) the list of access points stored in its memory, by replacing it with the list generated by the ANDSF server. Thus, the mobile terminal UE during movement may connect to another access point, in this updated list, which allows it to continue to receive the service which it accesses, before triggering the mobility process, without degradation of service quality.

The invention is not limited to the method described above but also relates to a communications network comprising: a plurality of access points Api able to deliver a service to a mobile terminal UE, an item of PCEF equipment for applying quality of services and a server for discovering ANDSF access points.

In this network, the item of PCEF equipment for applying quality of services is configured for determining a service class depending on a service accessed by the mobile terminal UE and for transmitting (S5) said service quality class, as applied in the network to the server for discovering ANDSF access points.

Further, the server for discovering ANDSF access points is configured for generating (step S7) a list of access points by selecting at least one access point compatible with the service quality class received from the item of PCEF equipment for applying quality of services and for transmitting (S8) to the mobile terminal UE said list of access points.

Moreover, the invention also relates to a mobile terminal UE comprising a module (implemented for example as a computer program installed in a processing method comprising a processor) for selecting an access point of a communications network. This selection module is specifically configured for selecting an access point from the list of access points received from the server for discovering ANDSF access points of the communications network, this list of access points having been generated by selecting at least one access point compatible with the service quality class determined by the item of PCEF equipment for applying service quality depending on the service accessed by the mobile terminal UE.

Further, the invention also relates to a computer program product comprising code instructions for executing the method described above, when the latter is executed by a processor.

The invention claimed is:

1. A method for managing mobility of a mobile terminal in a communications network comprising a plurality of access points and a server, the method being performed by the server and comprising:
   discovering a plurality of access points in the network;
   receiving a service quality class determined by an item of equipment for applying service quality, said service quality class being associated with a type of service being accessed by said mobile terminal during the current session while the mobile terminal is moving; and
   generating a list of access points by selecting at least one access point from said plurality of discovered access points, wherein said at least one selected access point is compatible with the service quality class determined by the item of equipment for applying service quality.

2. The management method according to claim 1, wherein the item of equipment for applying service quality transmits to a server of service quality rules, a request for determining the service quality to be applied to the service accessed by the mobile terminal, and receives from said server of rules for applying service quality, the service quality class associated with said service.

3. The management method according to claim 1, wherein the generation of the list of access points follows reception by the server of a request for recovering said list of access points transmitted by the mobile terminal, the method further comprising: transmission of the generated list of access points to the mobile terminal; and updating of the list of access points stored in the mobile terminal using the generated list of access points.

4. The management method according to claim 1, wherein the access point compatible with the service quality class is an access point capable of providing the service according to a service quality class providing a service quality level greater than or equal to the service quality class determined by the item of equipment for applying service quality.

5. The method according to claim 1, wherein the server configured for discovering access points is an ANDSF server according to the 3GPP standard and the item of equipment for applying service quality is an item of equipment configured for applying a PCEF function as defined by the 3GPP standard.

6. A server configured to:
   discover a plurality of access points in the network;
   receive a service quality class determined by an item of equipment for applying service quality of the communications network, said service quality class being associated with a type of service being accessed by said mobile terminal during the current session while the mobile terminal is moving; and
   generate a list of access points by selecting at least one access point from said plurality of discovered access points, wherein said at least one selected access point is compatible with the service quality class received from the item of equipment for applying service quality.

7. The server according to claim 6, wherein the item of equipment for applying service quality transmits to a server of service quality rules, a request for determining the service quality to be applied to the service accessed by the mobile terminal, and receives from said server of rules for applying service quality, the service quality class associated with said service.

8. The server according to claim 6, wherein the generation of the list of access points follows reception by the server of a request for recovering said list of access points transmitted by the mobile terminal, the server further configured to:
   transmit the generated list of access points to the mobile terminal; and
   update of the list of access points stored in the mobile terminal using the generated list of access points.

9. The server according to claim 6, wherein the access point compatible with the service quality class is an access point capable of providing the service according to a service quality class providing a service quality level greater than or equal to the service quality class determined by the item of equipment for applying service quality.

10. An item of equipment for applying quality of service, said item of equipment configured to receive from a mobile terminal a type of service associated with the service being accessed by the mobile terminal during the current session while the mobile terminal is moving; determine a service quality class associated with said type of service; and transmit said service quality class to a server configured to discover a plurality of access points in a communications network being utilized by said mobile terminal, wherein said server is also configured to generate a list of access points by selecting at least one access point from said plurality of discovered access points, and wherein said at least one selected access point is compatible with the service quality class determined by the item of equipment for applying quality of service.

11. The item of equipment according to claim 10, further comprising:

transmitting to a server of service quality rules, a request for determining the service quality to be applied to the service accessed by the mobile terminal; and receiving from said server of rules for applying service quality, the service quality class associated with said service.

12. The item of equipment according to claim 10, wherein the generation of the list of access points follows reception by the server of a request for recovering said list of access points transmitted by the mobile terminal, said server further configured to:

transmit the generated list of access points to the mobile terminal; and update the list of access points stored in the mobile terminal using the generated list of access points.

13. The item of equipment according to claim 10, wherein the access point compatible with the service quality class is an access point capable of providing the service according to a service quality class providing a service quality level greater than or equal to the service quality class determined by the item of equipment for applying service quality.

14. A mobile terminal configured to select an access point in a communications network being utilized by said mobile terminal from a list of access points received from a server configured to discover a plurality of access points in said communications network wherein said server is also configured to generate said list of access points by selecting at least one access point from said plurality of discovered access points, wherein said at least one access point selected by said server is compatible with the service quality class determined by an item of equipment for applying quality of service, wherein said item of equipment is configured to receive from said mobile terminal a type of service associated with the service being accessed by the mobile terminal during the current session while the mobile terminal is moving, to determine a service quality class associated with said type of service and to transmit said service quality class to said server.

15. The mobile terminal according to claim 14, wherein the server is further configured to:

transmit to a server of service quality rules, a request for determining the service quality to be applied to the service accessed by the mobile terminal; and receive from said server of rules for applying service quality, the service quality class associated with said service.

16. The mobile terminal according to claim 14, wherein the generation of the list of access points follows reception by the server of a request for recovering said list of access points transmitted by the mobile terminal, said server further configured to:

transmit the generated list of access points to the mobile terminal; and update the list of access points stored in the mobile terminal using the generated list of access points.

17. A communications network comprising: a plurality of access points capable of delivering a service to a mobile terminal; an item of equipment for applying quality of services; and a server configured to discover a plurality of access points in a communications network being utilized by said mobile terminal, the item of equipment for applying quality of service being configured to receive from the mobile terminal a type of service associated with the service being accessed by the mobile terminal during the current session while the mobile terminal is moving, to determine a service quality class associated with said type of service and to transmit said service quality class to said server configured to discover said plurality of access points; and the server configured to discover said plurality of access points also being configured to generate said list of access points by selecting at least one access point from said plurality of discovered access points, wherein said at least one access point selected by said server is compatible with the service quality class determined by said item of equipment for applying quality of service.

18. The communications network according to claim 17, wherein the server is further configured to:

transmit to a server of service quality rules, a request for determining the service quality to be applied to the service accessed by the mobile terminal; and receive from said server of rules for applying service quality, the service quality class associated with said service.

19. The communications network according to claim 17, wherein the generation of the list of access points follows reception by the server of a request for recovering said list of access points transmitted by the mobile terminal, said server further configured to:

transmit the generated list of access points to the mobile terminal; and update the list of access points stored in the mobile terminal using the generated list of access points.

20. A non-transitory computer readable medium having stored thereon instructions for performing a method for managing mobility of a mobile terminal in a communications network comprising a plurality of access points and a server when said instructions are executed by a processor, the method being performed by the server and comprising:

discovering a plurality of access points in the network;

receiving a service quality class determined by an item of equipment for applying service quality said service quality class being associated with a type of service being accessed by said mobile terminal during the current session while the mobile terminal is moving; and generating a list of access points by selecting at least one access point from said plurality of discovered access points, wherein said at least one selected access point is compatible with the service quality class determined by the item of equipment for applying service quality.

* * * * *